United States Patent [19]

Travis

[11] Patent Number: 5,082,525

[45] Date of Patent: Jan. 21, 1992

[54] METHOD AND APPARATUS FOR IMPROVING THE PERFORMANCE OF LIQUID WASTE EVAPORATORS

[75] Inventor: Samuel G. Travis, Bedford, N.H.

[73] Assignee: Hea Associates, Inc., Goffstown, N.H.

[21] Appl. No.: 472,584

[22] Filed: Jan. 30, 1990

[51] Int. Cl.$^5$ .................. B01D 1/14; B01D 3/42; C02F 1/14
[52] U.S. Cl. .................. 159/16.1; 159/40; 159/47.3; 159/DIG. 32; 202/182; 202/235; 202/160; 203/1; 203/2; 203/49; 203/100
[58] Field of Search .......... 159/16.1, 47.3, 38, 159/40, DIG. 32, 26.1, 28.1, 29; 203/1, 100, DIG. 18, 2, 49; 202/182, 235, 160, 206

[56] References Cited

U.S. PATENT DOCUMENTS

| | | | |
|---|---|---|---|
| 53,226 | 3/1866 | Kohly, Jr. ............... | 159/16.1 |
| 108,169 | 10/1870 | Newby .................. | 159/29 |
| 108,288 | 10/1870 | Newby .................. | 159/29 |
| 113,590 | 4/1871 | Sperry .................. | 159/40 |
| 291,520 | 1/1884 | Kayser .................. | 159/29 |
| 3,393,131 | 7/1968 | McIntyre, Jr. ........... | 203/40 |
| 3,488,686 | 1/1970 | Dunwoody et al. ....... | 159/29 |
| 4,002,536 | 1/1977 | Rajakovics ............. | 159/DIG. 12 |
| 4,534,828 | 8/1985 | Erickson et al. ......... | 159/40 |

OTHER PUBLICATIONS

The Nordale FLUID Eliminators—Reduce Waste Disposal costs and Liabilities.

Primary Examiner—Virginia Manoharan
Attorney, Agent, or Firm—Hayes, Soloway, Hennessey & Hage

[57] ABSTRACT

An improved method of and apparatus rendering water-based fluid waste stream evaporation operations environmentally and otherwise safe, involving separately and independently existing the hot gas stream produced by fuel combustion and the vaporized fluid-air exhaust stream resulting from heat-vaporizing of the fluid, independently directing the streams in opposite directions toward one another and to a common region, and applying fan suction immediately at said region to exert the sole control of withdrawing the streams simultaneously.

13 Claims, 5 Drawing Sheets

METHOD AND APPARATUS FOR IMPROVING THE PERFORMANCE OF LIQUID WASTE EVAPORATORS

BACKGROUND OF THE INVENTION:

1. Field of the Invention

The present invention relates to systems, i.e. methods of and apparatus for evaporating liquids. The invention has particular utility for use in connection with the evaporation of the water portion of water-based liquid wastes and will be described in connection with such utility, although other utilities are contemplated. More particularly, the present invention is directed to systems for converting portions of the liquid to environmentally safe vapors while concurrently separating the various other constituents such as oils and solids resident in the liquid. The primary objective is a safe and economical method and apparatus to reduce the disposal volume and therefore the escalating costs and liabilities associated with the disposal of water-based liquid wastes.

Current environmental pressures are forcing industry to find more satisfactory and economical methods of dealing with their increasingly regulated water-based wastes, other than putting them down the drain or shipping them off-site. Ever tightening sewer regulations are eliminating the "to drain" method as an option. Shipping wastes off-site incurs both high costs and ongoing legal liabilities.

2. Description of the Prior Art

A variety of methods have been proposed to address the disposal of contaminated waters, such as filtration or chemical treatment. However, each of these methods has certain operational drawbacks, economic restraints, and inabilities to meet new and anticipated regulatory limitations. Evaporators of various designs also have been proposed to address disposal of contaminated waters. While not eliminating the disposal problems entirely, evaporators have the advantage of reducing the bulk, thus facilitating subsequent handling. However, many prior art evaporators tend to be large in size, expensive in cost, complex and not geared toward handling the remaining oils, solids and/or sludge generated by the new type of applications.

More recently there has been proposed a generation of relatively small evaporators designed for on-site installation. See, for example, Erickson et al, U.S. Pat. No. 4,534,828 and the water evaporator earlier marketed by Samsco, Inc. as described in its bulletin "The Nordale Fluid Eliminator", 1988. While the Nordale Fluid Eliminator marketed by Samsco, Inc. has achieved a certain degree of commercial success, commercial acceptance has been less than overwhelming due to certain design deficiencies of the Nordale unit. For one, the Nordale unit is subject to uncontrolled variables which may negatively affect the efficiency of the operation and consistency in results. These uncontrolled variables also can create costly maintenance requirements, and may give rise to certain fire safety hazards.

The present invention overcomes the foregoing and other problems inherent in the Nordale unit. It overcomes the attendant inconsistencies in the safety, efficiency and performance of the Nordale unit and the resulting costly maintenance and operation problems experienced.

Figure 1:
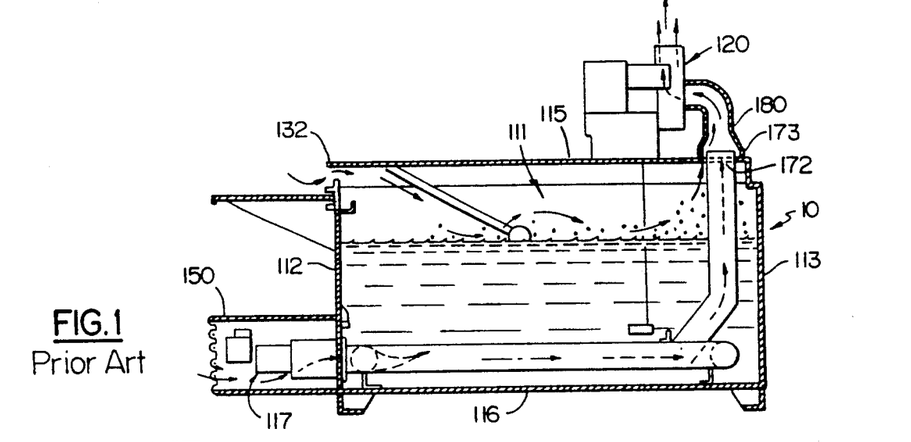
FIG. 1 is a side elevational view of a fluid evaporator made in accordance with the prior art as taught by Erickson et al, U.S. Pat. No. 4,534,828.

Referring to FIG. 1 of the drawings, which corresponds to FIG. 1 of Erickson et al, U.S. Pat. No. 4,534,828, there is shown a prior art evaporator as described in the aforesaid Erickson et al patent. The apparatus comprises a rectangular container or tank 111 for holding a fluid. Tank 111 includes a heater 117 for supplying heat, and is positioned adjacent the bottom 116 of the tank. Tank 111 includes an air inlet 132 adjacent the top front end 112 and an outlet opening 173 in the tank top 115 adjacent the tank back end 113. A suction blower fan 120 pulls air into the fluid-containing tank 111. A pivoting floating baffle mechanism indicated generally at 119 forces air to flow adjacent the surface of the liquid contained in the tank 111. Initially air/oxygen is drawn through the burner assembly 150 where the air/oxygen mixes with the fuel to provide combustion. The resulting gaseous stream is comprised of burner gases. Secondly, ambient air is drawn into the tank 111 and across the surface of the heated fluid via opening 132 in the tank, whereby to pick up water vapor overhead. The two exhaust gas streams, comprised of burner gases and water vapor-air, are drawn from the tank through a common lid exhaust opening 132 and into a continuation draft diverter extension 180. The smaller diameter burner tube exit 172 is positioned in the center of the larger diameter exhaust opening 173 and continuing draft diverter 180. This is so positioned relative to the exhaust opening in order that a perfect annulus configuration is provided. The water vapor-air stream forms the outer ring of the annulus, and the hot flue gases form the inner ring of the annulus. Both streams flow in the same direction, one surrounding the other.

According to Erickson et al, the velocity of the hot flue gases aspirate the outer annular air/vapor stream along with it, as the two streams exit the tank through the one exhaust opening. In practice, it has been observed that fluctuations in operational variables can affect the gas/oxygen ratio equilibrium. Such fluctuations change the air/oxygen flow through the burner and burner tube, while the gas volume remains constant. This can result in deleterious inconsistencies and air flow complexities, including periods of incomplete combustion or excess air, due to an insufficient or excessive air-to-gas ratio respectively.

When the lid of such prior evaporation tanks is opened, there are changes in the air flow being drawn into the tank. These can dramatically change the air characteristics of the air/vapor stream flowing by the burner tube and thus the characteristics of the combustion gas/air flow being drawn through the burner and burner tube. This creates the danger of sudden flashback through the burner, which can lead to extinguishing the burner flame. Such undesired shutting down results in production losses until it is discovered, requiring re-starting with its attendant maintenance and labor cost.

If the operation continues running with the lid up, the burner can run rich and will have incomplete combustion. This can cause maintenance problems and seriously reduced efficiency. Soot frequently coats the inside of the burner tube, insulating it and allowing the heat to go up the stack rather than being transferred through the heat exchanger to the liquid as required. Soot also may clog the burner tube exit, which, causes the burner to burn even more inefficiently and creates a cycle of worsening conditions, producing additional sooting. This in turn causes even richer gas mixtures, with continuing loss of efficiency, increased cost of operation, production downtime, and maintenance costs to remove the accumulated soot.

These prior designs provide the operator only a crude fixed cast device with holes for adjusting and matching air/oxygen input with gas volume input, so as to maintain a constant ratio at any BTU level. To change the air/oxygen volume to match changes in the gas volume, the operator is required either to increase hole diameters by drilling or reduce hole diameters by placing bolts in existing holes. Such designs do not provided a simple, controllable or other way to access the correctness of such combustion air adjustments. It must be checked by looking down the tube and visually assessing the color, length and brightness of the flame as air volume changes.

SUMMARY OF THE INVENTION

The present invention overcomes the aforesaid and other disadvantages and limitations of the prior systems and provides a previously unattainable degree of stabilized and efficient operation with operator control.

More particularly, the present invention provides separate hot gas and water vapor-air streams. This eliminates the interplay between the gas streams and therefore controlling the air flow fluctuations that have caused the prior noted problems. Such separation of streams also makes it possible to take direct efficiency readings on the gas/air ratio. This provides the user with a simple industry standard approach to testing combustion efficiency, thereby eliminating safety and performance problems. The user thus can enjoy a wider controlled operative range of BTU gas volume and a wider range of evaporative rates.

In summary, the apparatus of the invention provides a means for converting a water-based fluid containing water-soluble and insoluble waste contaminants into an environmentally safe vaporous exhaust. The fluid in the tank is heated by combusting fuel and flowing the resulting hot gases through flue tubing within the fluid so as to vaporize it. The hot gas stream then exits externally to the tank while flowing air above the fluid to cause the vaporized fluid and air stream also to flow external to the tank. Furthermore, the invention provides (a) a method of stabilizing the conversion and maintaining the efficiency and safety irrespective of the opening or closing of the tank to the external air environment; (b) preventing other air flow variation that can cause possible flashback in the flue tubing by generating fan suction at a predetermined region external to the tank; (c) funneling the hot gas stream along the said flue tubing externally of the tank; (d) separately and independently funneling the fluid vapor-air stream externally of the tank; (e) directing the separate streams of equal pressures from opposite directions with no annulus nor attendant aspiration effect below to a common region in front of the predetermined region; and (f) withdrawing both the hot gases stream and fluid vapor-air stream simultaneously and immediately from said common region by such fan suction to enable said fan suction to essentially control the exiting of each of the hot gas stream and the fluid vapor-air stream.

The invention, furthermore, provides the generator of water-based wastes with a simple method and apparatus for evaporating the water portion of such liquid wastes. This is accomplished while concurrently separating out other constituents that are within the liquid. This eliminates the need to deal with tighter sewer restrictions and reduces the volume of wastes. Therefore, the costs and liabilities associated with shipping these wastes off-site are reduced. The estimated volume reduction is normally 85%-95%.

It is very important that this type of equipment be capable of running safely and consistently with entry level personnel and/or for running unattended. Design engineering must plan for the lack of attention given the evaporator in a factory environment. Design parameters also must enable operation with the many types of waste-stream applications that will be processed through the equipment. Appropriate concern must be given for both burner safety and maintenance considerations, while performing waste reduction functions simply, economically and consistently.

As previously stated, the equipment incorporates a tank for containing the liquid, a heat source, and a heat-exchanger in the tank for heating the liquid to effect evaporation. Because the design uses a suction blower fan for multiple purposes, it is necessary that any airflow variables be controlled. Airflow variables in the air stream must be held constant so as not to affect the efficiency or safe functioning of the heat source and heat transfer system. In accordance with the invention, the blower system serves multiple functions. First, the blower provides the air that is required for the induced draft combustion that takes place in the heat exchanger. Secondly, it draws the required ambient air across the surface of the boiling liquid to combine with the water vapors that are constantly being released from the boiling surface. This combined water vapor-air mixture creates a vapor with a lower dew point, thereby combatting premature condensation during exhausting. Thirdly, the suction blower system draws the noted two separate streams of combustion gas and water-air vapor mixture from the tank via their own discrete apertures separated in the lid. The two streams are drawn independently and from opposite directions at equal pressures into a simple common manifold system, where they are withdrawn together by the suction fan for exhausting to atmosphere.

The simple removal of constituents other than water is accomplished by two means. The floating oils are overflowed out of the unit through an upper valved outlet. The solids and particulates that concentrate and/or drop to the tank bottom are drained out of a larger opening positioned near the bottom.

Because of expected unattended operation and/or operator inattention, a variety of safety burner shutdown devices are integrated into the system. These devices provide for the shutdown of the burner in the event that (a) the airflow provided by the blower is interrupted, (b) the liquid level drops below a predetermined level, (c) the liquid temperature rises above a predetermined temperature, (d) the heat exchanger temperature rises above a predetermined temperature, and/or (e) the gas pilot-flame-proving rectification system senses no flame. A control panel provides specific information as to the normal operating or shutdown conditions at any given time.

The floor space required for the evaporation/separation apparatus of the invention is relatively small. Installation requires only a few connections: (a) 110 V/220 V/440 V AC, (b) combustion fuel, (c) liquid waste inlet, (d) outlets for remaining constituents, and (e) an exhaust stack.

BRIEF DESCRIPTION OF THE DRAWINGS

The invention will be better understood by reference to the attached drawings in which like numbers denote like parts, and wherein.

DESCRIPTION OF THE PREFERRED EMBODIMENTS

Figure 2:
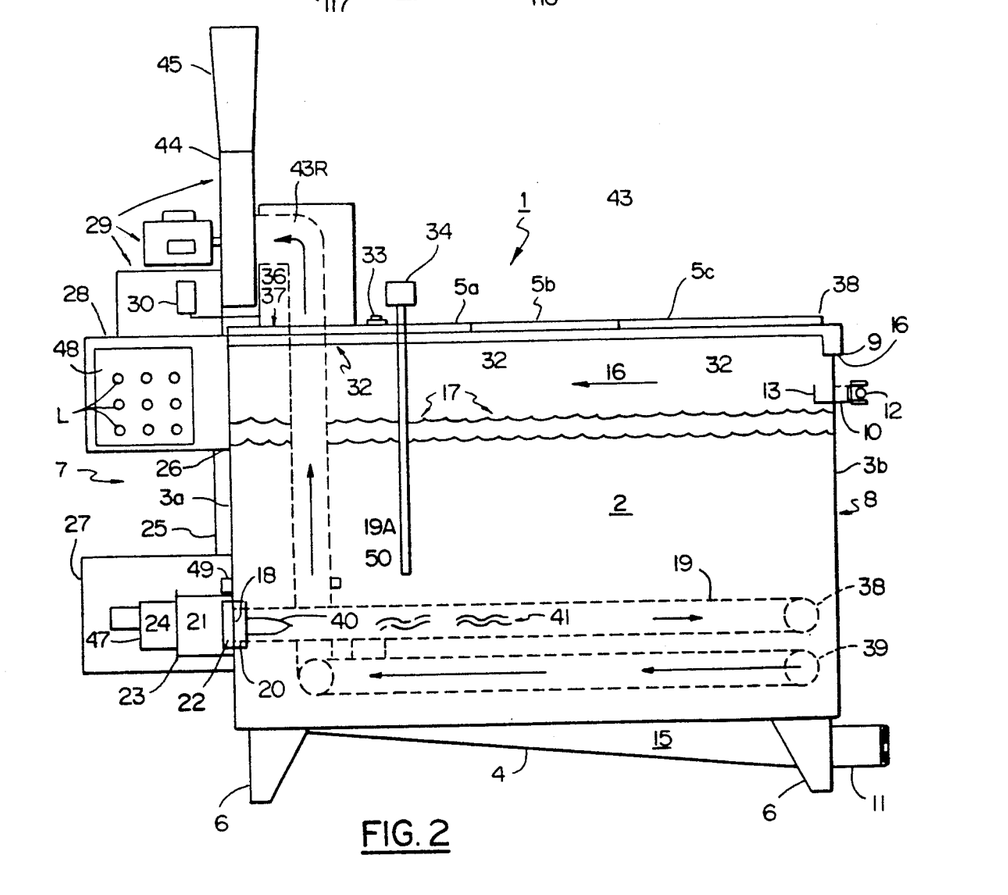
FIG. 2 of which is a side elevation of a preferred embodiment of the invention with a side panel removed.
Figure 3:
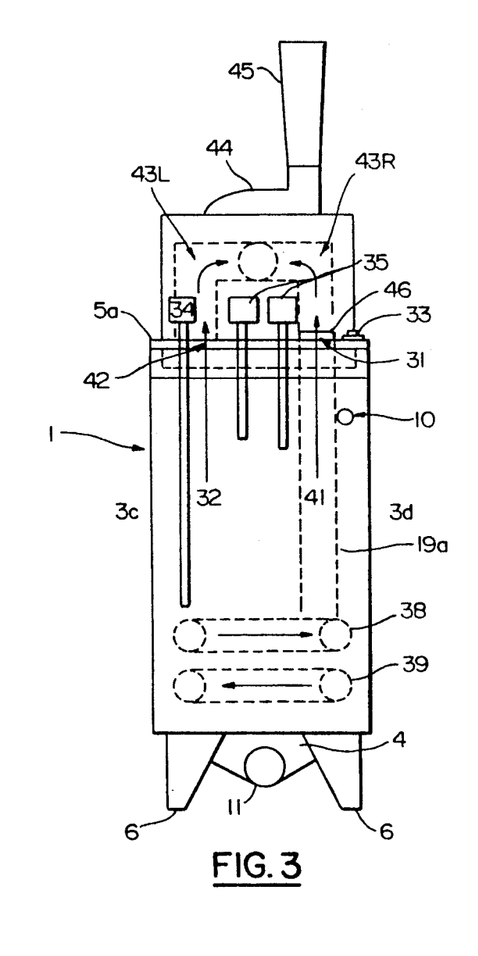
FIG. 3 is an end view of the same.

Referring to FIGS. 2 and 3 of the drawings, the evaporator/separator is shown provided with a leak-free rectangular holding tank 1 for water-based liquid or fluid 2 such as from water-based waste streams. It has walls on all four sides 3a, 3b, 3c, 3d, a bottom 4, and segmented top lid 5a, 5b, 5c. The tank 1 may be constructed of various metals and preferably has support legs 6 of various designs. It may be insulated along the walls, bottom and lid (3a, 3b, 3c, 3d, 4, 5a, 5b, 5c) for both safety and efficiency. If desired, it may be of other geometrical configurations, as well.

The evaporator/separator system has a "dry end" 7 and a "wet end" 8, shown respectively at the left and right in FIG. 2. All the electronics, controls, sensors, blower, heat source, moving parts and exhaust are located at the "dry end" 7. The air inlet 9, threaded oil overflow outlet 10 and a sludge/slurry outlet 11 are located at the "wet end" 8. The threaded oil overflow outlet 10 is provided with a valve 12 connected to an overflow trough 13 for the removal of oils 14 free-floating on the water. The sludge/slurry threaded bottom outlet 11 enables removal or separation of sludge/slurry 15. The air inlet 9 provides ambient air 16 for flowing across the surface of the heated fluid at 17. This ambient air combines with the water vapors 32 generated by the heating and rising from the liquid surface 17, thereby lowering the dew point of the newly created water vapors. The precise positions and size of all three openings can vary as desired. The tank 1 is also shown with its bottom wall 4 sloped to facilitate removal of the sludge/slurry 15, the shape of which can be varied based upon the type of waste material.

At the dry end 7, a hole 18 is provided in the tank side 3a to facilitate the watertight attachment of a tubular heat exchanger 19 to the tank side 3a, as by a mating flange system. One flange 20 is permanently attached to the heat exchanger 19 inside of the tank 1. On the outside of the tank side 3a is a flanged extension pipe 21, the flange end 22 of which mates with the heat exchanger flange 20 by bolts through the tank 3a. The other flange end 23 is used to mate with and attach the heat source 24, such as an atmospheric natural/propane gas or oil burner system within a protective shroud 27. The system can be converted to an induced draft system with the help of a top-mounted high pressure suction fan blower 44.

Along the tank side 3a, a support structure 25 is disposed. It carries shelf structures 26 and 28, respectively, to support both the burner shroud 27 and the blower assembly 29, together with its air-flow sensing switch 30 and associated conduit.

The design embodies three top lid segments or sections 5a, 5b and 5c, each with its own function. As seen in FIGS. 2 and 3, left-most lid 5a provides separate apertures for heat-source exhaust gas exit 31, air/water vapor mixture exit 42, liquid inlet 33, safety low liquid level shut-off 34, and automatic fill-level controls 35, a thermocouple wire outlet 36 and blower fan drain back 37. Center lid 5b is hinged to the rear. By the removal of two fasteners in the front, it provides additional access to the interior for periodic maintenance. Right lid 5c with handle 38 is hinged to the rear and provides ease of daily inspection.

In operation, the heat source burner 24 generates a flame 40. The resulting hot gases 41 are drawn through the heat exchanger 19 located within the lower portion of the tank near the bottom of fluid 2. The heat exchanger 19 transfers heat to the fluid 2.

The heat exchanger 19 in this embodiment is of tubular geometry, being welded or formed of proper diameter, length, configuration and location to both provide the required efficiency and to minimize any possible caking problems. In the preferred embodiment shown, the heat exchanger 19 is in two layers 38 and 39. These extend predominantly parallel to ground level, except for its vertical exit at later-described flue tubing 19A. Dimensional and configuration specifics can change with changes in tank size and application. However, a spacious open portion is provided in the center of the heat-exchanger loop configuration, so as to provide access to the bottom for cleanout maintenance.

The top-mounted high pressure blower 44 plays a major role in the operation of this device by performing five vital functions. First, the blower 44 pulls outside ambient air 16 through the air inlet 9 on tank side 3b across the surface of the liquid 17 as previously described, lowering the dew point of the heat-evaporated water vapors 32.

Secondly, the blower 44 converts a normal atmospheric draft gas burner system 24 into an induced draft gas burner system. It does this by drawing the proper amount of air/oxygen 47 into the burner 24 for complete combustion and efficiency. Here the drawn air/oxygen is combined with gas, with the suction fan blower 44 pulling both the flame 40 and the combustion gases 41 along and through the heat exchanger 19 and 19A.

Figure 4:
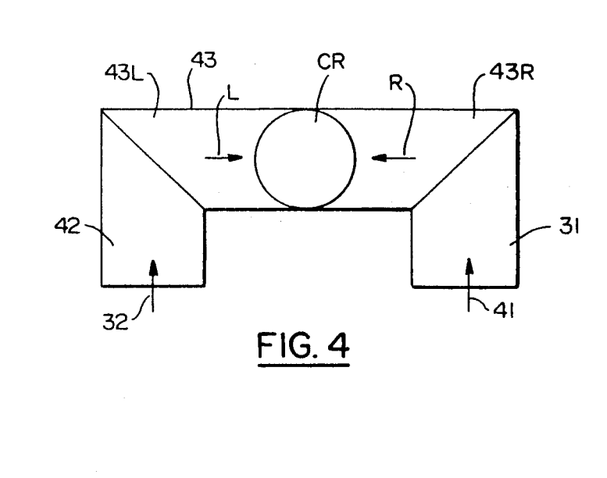
FIG. 4 is a detail view of a manifold assembly portion of the invention, illustrated with an enlarged scale.

Thirdly, in accordance with the present invention, the upper section blower 44 extracts, independently and separately, the two discrete streams of combustion gases 41 and water vapor-air 32, through separate laterally displaced openings 31 and 42 respectively Refer to FIGS. 3 and 4 and the lid 5a. These two separate streams 41 and 32 drawn outside of the unit, flow from equal distances and from opposite sides of the lid. They move through identical cross-dimensioned right-angle and oppositely extending manifold flue tubing sections 43L and 43R as noted in FIG. 4. They go directly and horizontally into the common suction fan housing 44 and then continue into the vertical stack 45.

The combustion gases 41 are thus funneled through the heat exchanger 19A upwardly in a closed continuous path through enclosed opening. This is external to and above the tank lid, being directed at section 43R right-angularly in the leftward direction to region R, on to common region CR. Independently and separately, in accordance with the invention and unlike said prior patent system's annulus and aspiration operation the water vapor-air flow 32 is independently pulled through opening 42 externally of the tank. It is directed at section 43L right-angularly in the rightward direction to Region L, onto common region CR with both streams of equal pressure approaching each other from opposite or opposing directions. They meet in common region CR, with the suction of the horizontal blower 44 exerting substantially the sole control on the exiting of streams 41 and 32. The blower 44 draws these discrete streams of equal pressures entering from opposite directions are routed up a common stack 45 for final exhausting.

It is by means of this significantly differing design and operation that isolates and insulates the system of the invention from combustion and efficiency variations upon lid opening or other extraneous airflow operational changes. It also eliminates any danger of flashback and performance and maintenance problems due to combustion fluctuations as in prior systems.

Figure 5:
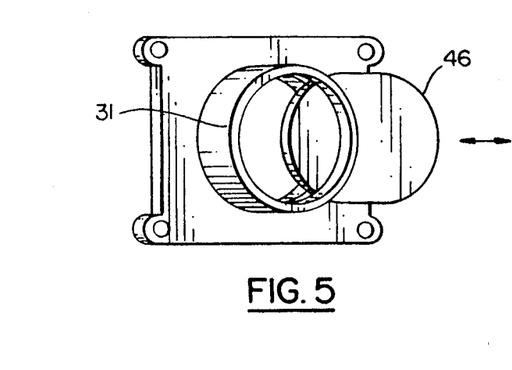
FIG. 5 is a transverse sectional view of a knife gate incorporated in the hot gas exhaust stream.

As described, there are two separate laterally displaced exit openings in the left lid 5a relative to the exhausting function. These are the water vapor-air stream outlet 42 and the heat exchanger gas stream exhaust outlet 31. The gas exhaust outlet incorporates an adjustable knife gate 46 as shown in FIGS. 3 and 5. This serves to regulate the proper amount of oxygen/air flow 47 entering the burner 24 and heat exchanger 19 and 19A for efficient, safe and consistent combustion at varying BTU levels. The adjustable knife gate 46 at flue gas 31 is merely a preferred embodiment, and other types of fluid regulators may be employed.

Figure 6:
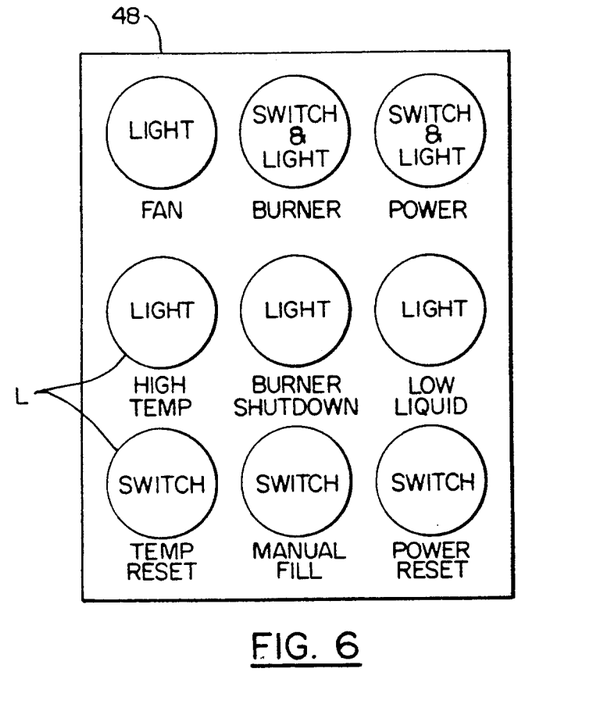
FIG. 6 is a detail view of the indicator control panel of the system.
Figure 7:
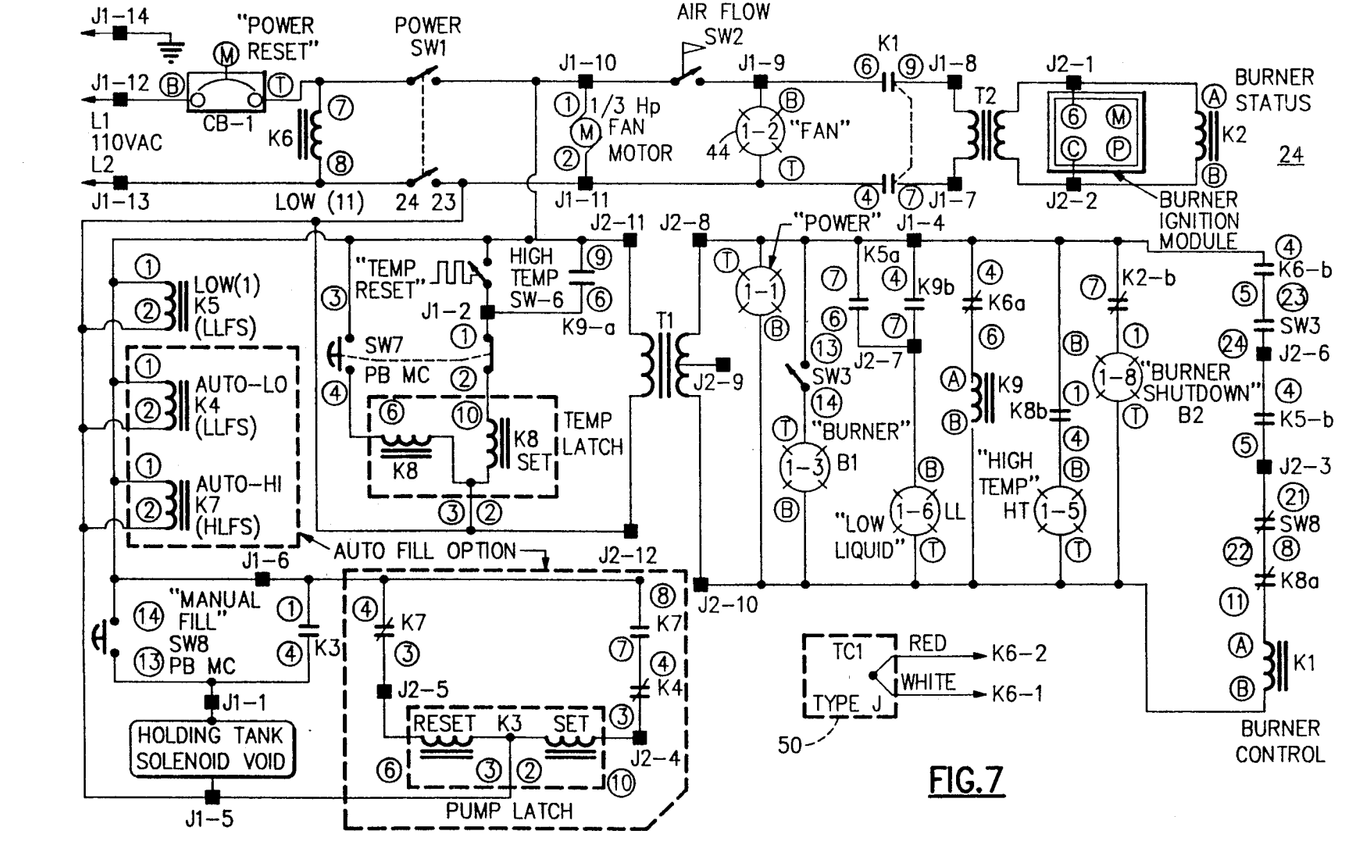
FIG. 7 is a schematic wiring diagram of the operating control circuit.

Returning to the dry end 7 of the system there is provided a full complement of both operational components, safety sensors and a complete control panel 48 with indicator lights L as noted in FIGS. 2 and 6. The electrical schematic, FIG. 7, shows both 110 V AC and 24 V circuits. The switches and indicator lights actuate and/or depict various normal operating conditions, as well as a variety of burner safety shutdown conditions.

As shown in FIG. 6, conventional control panel indicator lights are provided for the suction blower or "FAN" on-off condition. The circuit of FIG. 7 showing the fan motor circuit is at J1-10 and J1-11 for the suction blower fan 44, with an indicator lamp identifying this at point J1-9, under control of air flow switch SW2, connected across the 110 V AC line. Once power switch SW1 is closed, the condition is shown indicated by the "POWER" lamp in FIG. 6. There is a burner ignition indicator lamp "BURNER" on panel 48, FIG. 6, for the burner 24, the circuit for which is shown at J2-1 and J2-2 and B1 in FIG. 7. A "BURNER SHUTDOWN" indicator lamp is shown in FIG. 6, with corresponding control circuitry at B2 in FIG. 6. A pair of "HIGH TEMPERATURE" and "LOW LIQUID" warning lights is labelled in FIG. 6, with the sensing circuit controls respectively at HT, SW-6, and LL in FIG. 7. There is a "MANUAL FILL" indication of FIG. 6 and/or automatic fill terminals 13 and 14 of switch SW8 of FIG. 7, with automatic option with pump latch provided through terminals J2-4 and J2-5). Also provided is a temperature reset switch "TEMP RESET", FIG. 6, with latch circuit controlled by switch Sw7, FIG. 7 Finally, an overall system "POWER RESET" circuit breaker of FIG. 6, is controlled by reset button CB-1 of FIG. 7.

Returning to the tank-filling techniques, tank 1 is filled through the liquid inlet 33 with approved water-based liquids to the proper operating level. This is done either by automatic fill-level controls 35 in this preferred embodiment, or the unit may also be filled manually as previously discussed.

The operating sequence is as follows. The before-described power switch SW1, FIG. 7, starts the blower fan 44 and opens the total electrical circuit. This comprises both the 110 V AC and 24 V circuits. The burner switch starts the burner 24 only if, the safety sensors are all satisfied.

Various conditions affecting the safety sensors will inhibit burner start-up and will also activate burner shutdowns after burner start-up. These safety devices include a conventional high temperature liquid-sensing device 49 located on the surface of the tank wall, FIG. 2. It will shut off the burner 24 and light the previously described HIGH TEMPERATURE lamp on the control panel 48 if a concentration of chemical constituents other than water drive up the temperature of the liquid. Once activated by the high heat shut-off 49, the burner 24 remains in the shut-off condition until activated by the manual reset switch SW6. An airflow sensing switch 30 will also shut off the burner 24 if the air flow from the blower fan 44 is lost for any reason. The conventional low liquid level sensing device 34 shuts off the burner 24, energizing the LOW LIQUID indicator lamp, by directly sensing if the liquid 2 drops to a predetermined low level. A thermocouple sensor 50, TC1 in FIG. 7, operates to shut off the burner 24 and illuminate the "HIGH TEMP" indicator lamp if the temperature of a predetermined point on the heat exchanger 19A rises above a preset temperature. Conventional pilot flame rectification sensors or other sensor types on the burner 24 will shut off the burner if the pilot flame is lost.

The control panel 48 format and the information it provides to the operator are thus designed to make the operation simple and provide a complete diagnostic picture of whether the device is operating in a normal mode or. If not, it indicates exactly what condition does exist, so as to enable the taking of corrective action as needed.

Heretofore, crude fixed flue dampers, in the form of plates with a central hole and series of small holes, have been used to make gross and most times inaccurate air/gas adjustments. In accordance with the invention, the sliding knife-gate 46, FIGS. 3 and 5, is directly connected to the hot gas flue 19A external to the lid. It is comprised of a single larger surface area opening than such flue dampers containing multiple small diameter openings. Therefore, the knife-gate is not as prone to plugging up with soot and in additional enabling gradual sliding adjustments simply by sliding the gate back and forth. This provides the user with a wider operative range of BTU gas volume and therefore a wider range of evaporative rates.

Unlike in the Erickson et al patent where air vapor stream mixes with gas combustion stream prior to exiting the tank, inhibiting the taking of accurate combustion efficiency/safety readings, this invention isolates totally the mixing of the air vapor and gas combustion streams. They combine at the manifold common region CR, so as to make possible the taking of efficiency measurements on the isolated gas combustion stream. This provides a designated point in the sliding knife-gate for acquiring an accurate digital readout on combustion efficiency. This digital readout ensures the accuracy of the simple knife-gate adjustments because they are based upon digital measurements. It further assists further in providing a wider range of gas volumes and evaporative rates.

Figure 8:
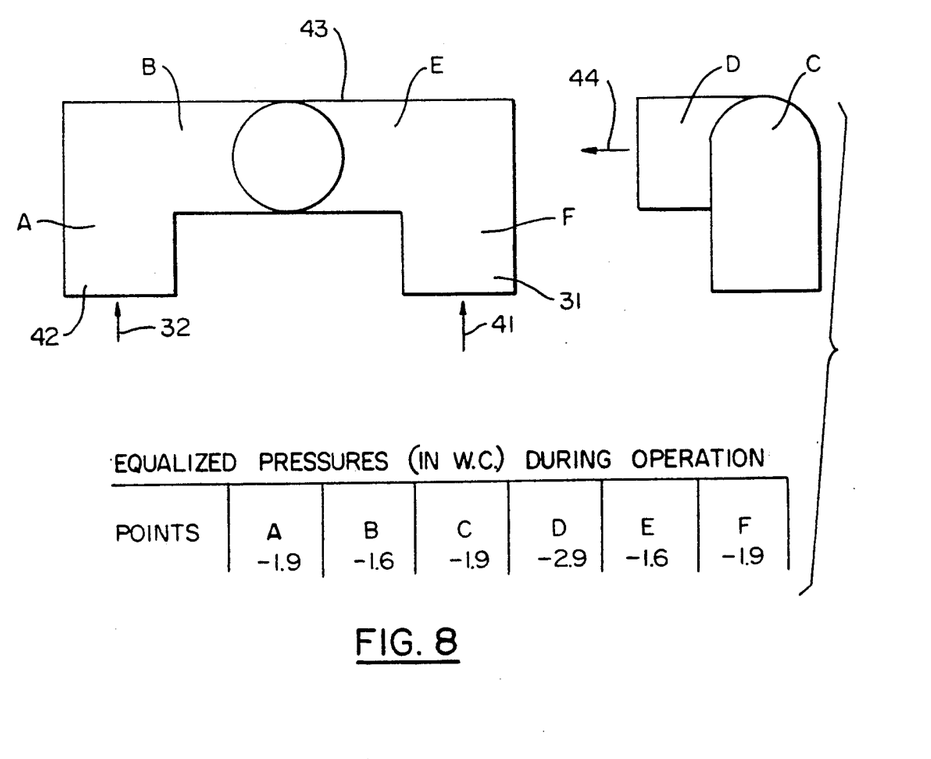
FIG. 8 is a combined diagram and performance chart of a system constructed in accordance with the invention.

FIG. 8 presents a chart of pressure measurements made in a system constructed in accordance with the design of FIGS. 2-7. As can be seen, the present invention, unlike the aspiration system of the Erickson et al patent, provides a balanced system with pressures. Pressures are identical at points A and F of the water vapor-/air stream 32 and the combustion gas stream 41 and at respective points B and E of respective extensions 43L and 43R. The pressures at common manifold region C and D are also presented. This clearly demonstrates that no aspiration is occurring, thereby preventing the attendant problems previously described.

Still an additional advantage of the technique of the invention, in exhausting the two streams from the tank via two separate exits, resides in the flexibility to add a condenser to the tank. This is for capturing and recondensating the air/water vapors, if desired, schematically designated at region C, FIG. 3. Such is not possible where the two streams are combined and exhausted as one stream as in said prior patent. Recondensating and capturing the air/water vapors is, of course, becoming more important to portions of the marketplace. This is particularly important where water availability is an issue and its cost is consequently increasing.

Figure 9:
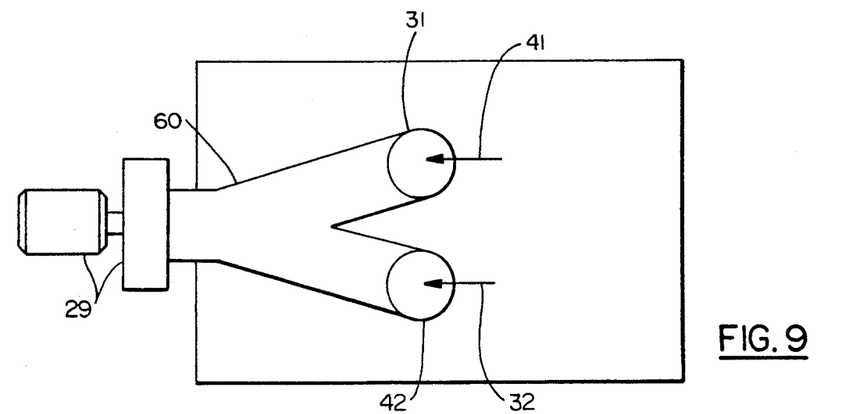
FIG. 9 is an elevation view of an alternative vapor extraction assembly which utilizes an angled opposing vapor collection and extraction assembly utilizing a single blower.

Various changes may be made in the foregoing without departing from the invention's concepts herein. For example, as shown in FIG. 9, the isolated air/water vapor 32 and combustion gas 41 may be fed in via the separate ducting 42, 31 to an angled common wye fitting 60. One or both ducts 42, 31 may be provided, if so desired, with a gate valve or the like for balancing the flows A single blower 29 exhausts the combined gas streams out through a common stack 45.

Figure 10:
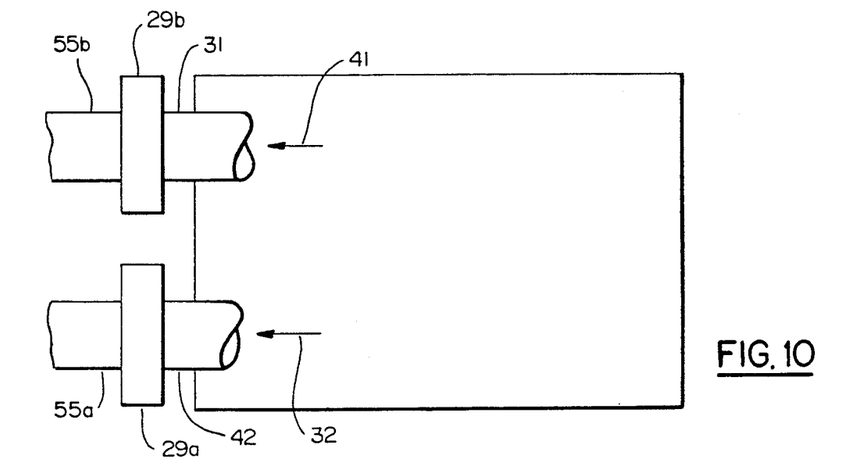
FIG. 10 is an elevation view of an alternative vapor extraction assembly which utilizes two separate blowers.

Alternately, as illustrated in FIG. 10, the combustion gas 41 and air/water vapor 32 streams are connected via separate ducting 31, 42 to individual blowers 29a, b. Each blower exhausts its gas stream through separate stacks 55a, b.

Figure 11:
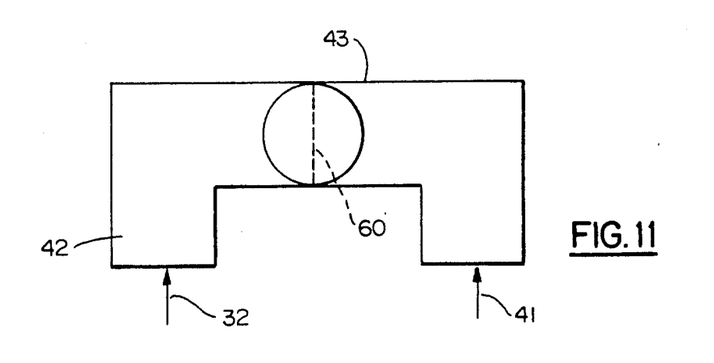
FIG. 11 is a detail view of an alternative manifold assembly portion of the invention, partly in cross section.

In yet another embodiment, as illustrated in FIG. 11, the manifold comprises a fixed baffle 62 for maintaining isolation of the gas streams upstream of the suction fan.

Yet other changes may be made as will be apparent to one skilled in the art.

What is claimed is:

1. In apparatus for converting a water-based fluid containing water-soluble and insoluble waste contaminants into environmentally safe vaporous exhaust, in which contaminated fluid in a tank is heated by combusting fuel and flowing the resulting hot gases through flue tubing with the fluid so as to heat and vaporize said fluid, means for flowing air above the fluid to cause the vaporized fluid and air stream to flow through an exit external to the tank, and at least one suction fan communicating with said means for flowing air external to the tank; the improvement which comprises means for funneling the hot gas stream along the said fluid tubing externally of the tank, and for separately and independently funneling the fluid vapor-air stream externally of the tank; means for exhausting said streams, wherein said exhaust means comprises means for directing said separate streams to a common region upstream of said at least one suction fan; and means for balancing the pressures of said separate streams within said means for directing.

2. In apparatus according to claim 1, the improvement wherein said exhaust means includes an angularly formed wye fitting upstream of said at least one suction fan.

3. In apparatus according to claim 1, the improvement wherein said at least one suction fan comprises a plurality of separate suction fans, the exhaust means including means for separately directing said separate streams to said plurality of said separate suction fans.

4. In apparatus for converting a water-based fluid containing water-soluble and insoluble contaminants into an environmentally save vaporous exhaust, and comprising a lidded tank for holding said fluid, a combustion gas stream first flue tubing disposed within said tank for heat exchange with said fluid, and means for flowing air above the fluid between the same and the tank lid to cause the heat-vaporized fluid-air stream to be carried along a second independent flue tubing externally of the tank and separately from the first flue tubing; the improvement which comprises means for equalizing the pressure of said combustion gas stream and said fluid vapor-air stream upstream of a common outlet region; a common exit tubing disposed at said common outlet region and provided with suction fan means for withdrawing hot gas and fluid vapor-air stream simultaneously, thereby stabilizing the heat exchange process and maintaining the efficiency thereof while preventing air flow variation from causing flashback in the hot gas flue tubing and out through the burner.

5. In apparatus as claimed in claim 4, the improvement wherein said combustion gas stream first tubing and the fluid vapor-air stream second flue tubing are disposed at laterally displaced apertures in the tank lid, extending vertically upward therefrom, the opposingly directed flue sections thereof extending at substantially right angles to the respective flue tubings toward one another and to said common outlet region at which the same common exit tubing extends horizontally from said common outlet region to said fan means.

6. In apparatus according to claim 5, the improvement wherein the effective cross-sections for each of the opposingly directed flue sections are equalized whereby the exiting suction of the said fan means serves as substantially the sole control of the withdrawing of each of the hot gas stream and the fluid vapor-air stream.

7. In apparatus according to claim 4, the improvement which comprises a sliding knife gating means in the hot gas stream flue tubing external to said tank.

8. In apparatus according to claim 4, the improvement which comprises means for varying the gas/air ratio while monitoring the same.

9. In apparatus according to claim 4, the improvement which comprises a sensing means for activating gas shutdown in the event of a predetermined condition.

10. In an improved liquid waste processing apparatus comprising a containing for a contaminated fluid, fitted with a combustion as heat source for supplying thermal energy to evaporate the fluid, a combustion flue assembly communicating with a burner assembly and located in the fluid for heat exchange with the fluid, and a draft mechanism for drawing off a stream of water vapor as it is formed, the improvement which comprises:
   (a) separate combustion gas and water vapor stream flue means to stabilize gaseous flow conditions and enable direct reading of gas/air ratio to determine combustion efficiency;
   (b) an adjustable knife gate means located in the combustion flue assembly;
   (c) a common manifold separately communicating with said combustion gas flue means and said water vapor stream flue means; and
   (d) a fan communicating with said common manifold for independently and simultaneously withdrawing the exhaust gas stream and said water vapor stream from said common manifold region.

11. In apparatus according to claim 10, wherein said container includes a sloped bottom, and including means adjacent the bottom of said tank for removing tank bottoms.

12. In apparatus according to claim 10, the improvement wherein said manifold includes a baffle for maintaining separation between said combustion gas and said water vapor stream.

13. In a method for converting a water-based fluid containing water-soluble and insoluble waste contaminants into environmentally safe vaporous exhaust wherein the contaminated fluid is heated in a tank by combusting fuel, and the resultant hot combustion gases are flowed through flue tubing in heat exchange contact with the fluid so as to heat and vaporize said fluid, and flowing air above the fluid to pick-up fluid vapor, the improvement which comprises separately and independently funneling the hot combustion gases and fluid vapor-air stream externally of the tank by directing separate stream of hot gases stream and fluid vapor-air stream of equal pressures from opposite directions to a common region and withdrawing both the hot gases stream and fluid vapor-air stream simultaneously from the common region by fan suction whereby said fan suction essentially controls the removal of the hot gas stream and fluid vapor-air stream, so as to prevent air flow variation that can cause flashback in the fluid tubing.

* * * * *

UNITED STATES PATENT AND TRADEMARK OFFICE
CERTIFICATE OF CORRECTION

PATENT NO.   : 5,082,525

DATED        : January 21, 1992

INVENTOR(S)  : Samuel G. Travis

It is certified that error appears in the above-identified patent and that said Letters Patent is hereby corrected as shown below:

Claim 10, Column 11, line 7, "as" should be "gas".

Signed and Sealed this

Fifteenth Day of June, 1993

Attest:

MICHAEL K. KIRK

Attesting Officer

Acting Commissioner of Patents and Trademarks